T. N. AIKENS.
TUBULAR SHEET METAL SPOKE FOR VEHICLE WHEELS.
APPLICATION FILED DEC. 9, 1921.
1,426,942.  Patented Aug. 22, 1922.
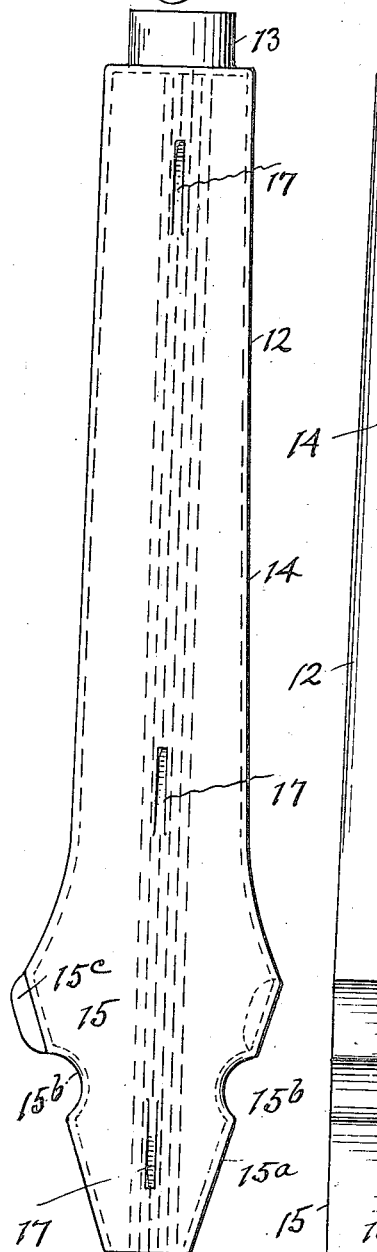
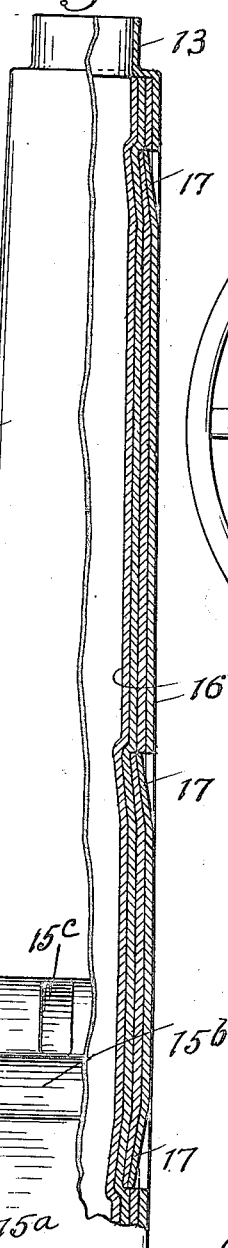
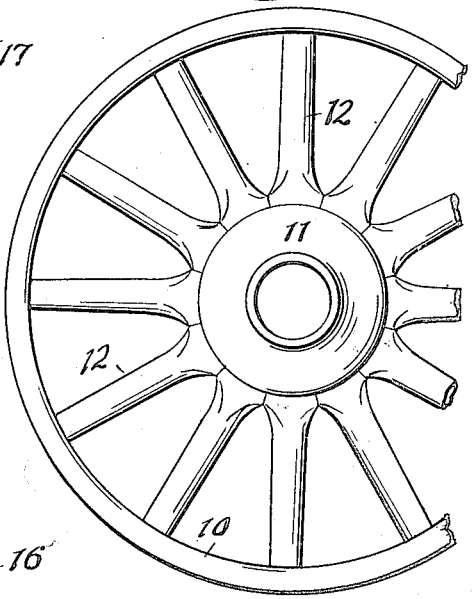
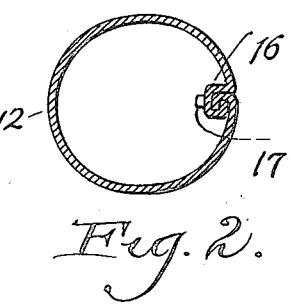

UNITED STATES PATENT OFFICE.

THOMAS N. AIKENS, OF LAKEWOOD, OHIO, ASSIGNOR OF ONE-HALF TO DAVID D. WALKER, OF LAKEWOOD, OHIO.

TUBULAR SHEET-METAL SPOKE FOR VEHICLE WHEELS.

1,426,942.   Specification of Letters Patent.   Patented Aug. 22, 1922.

Application filed December 9, 1921. Serial No. 521,143.

*To all whom it may concern:*

Be it known that I, THOMAS N. AIKENS, a citizen of the United States, residing at Lakewood, in the county of Cuyahoga and State of Ohio, have invented a certain new and useful Improvement in Tubular Sheet-Metal Spokes for Vehicle Wheels, of which the following is a full, clear, and exact description.

This invention relates to a fabricated steel wheel, and is an improvement on the construction constituting the subject matter of my prior application, Serial No. 487,292, filed July 25, 1921.

In said application, I have described and claimed an improved steel wheel having tubular spokes formed of sheet metal, the shape and construction of these spokes constituting an important feature of my prior invention. The spokes of the wheel disclosed in said application are each formed of one piece of sheet metal, and each includes an outer felloe end, a body portion, and an enlarged wedge-shaped hub portion having opposite tapered faces designed to be engaged by the correspondingly tapered faces of the adjoining spokes. It is an important feature of this spoke that the edges of the sheet of which the spoke is formed are united in the form of a folded seam which extends for practically the full length of the spoke, i. e., from the extreme hub end out to the felloe portion. This seam locks together the edge or marginal portions of the sheet metal piece, and it strengthens the spoke inasmuch as the seam forms a strengthening rib, which as before stated, extends for practically the entire length of the spoke.

The present invention resides particularly in an added feature of the spoke formed as described in my prior application, the object of the invention being to provide certain deformations in the seam which prevent the seam opening irrespective of the severe treatment to which a wheel may be subjected.

In carrying out the invention, the seam is provided with a series of depressions or indentations which displace the metal in the several layers forming the seam so as to effectively lock them against opening or spreading.

Further the invention resides in the particular shape or disposition of these locking indentations, the metal being preferably displaced in an inclined or tapered fashion which avoids the complete shearing of the metal at both ends of the indentation.

The invention may be further briefly summarized as consisting in certain novel details of construction, and combinations and arrangements of parts which will be described in the specification and pointed out in the appended claims.

In the accompanying sheet of drawings wherein I have shown the preferred embodiment of the invention, Fig. 1 is a side view of a fabricated steel wheel in which my invention may be embodied; Fig. 2 is a sectional view on an enlarged scale of one of the spokes; and Figs. 3 and 4 are respectively a side view and an edge view showing my improved spoke, a portion of Fig. 4 being in section.

Referring now to the drawings, the fabricated steel wheel includes a felloe 10 which is preferably formed of sheet metal as shown in my prior application, a hub 11, and a plurality of radial spokes 12 extending between and connected to the felloe and hub. Each of the spokes 12 like the spokes of my prior application, is formed of sheet metal, and is tubular, and each has a felloe end 13, a slightly tapered body portion 14, and an enlarged hub portion 15, the hub portion having two opposite flat faces adapted to engage the hub plates, and having two opposite tapered faces 15$^a$ adapted to engage the tapered faces of adjoining spokes. Likewise, the tapered faces are preferably provided with transverse deformations 15$^b$ which are substantially semi-circular, and when matched with the adjacent deformations of the adjoining spokes, form substantially circular openings for the hub bolts. Likewise, the faces 15$^a$ are preferably provided with longitudinally extending deformations 15$^c$ which interlock with corresponding deformations of adjoining spokes.

The marginal portions of the piece of metal from which the spoke is formd, are locked together in the form of a seam 16, which extends lengthwise of the spoke throughout the body and hub portions, and interfolded parts which form the seam lying on the inside of the spoke as clearly shown in Fig. 2.

The wheel and the construction of the spokes so far described, conform to the construction and arrangement fully described in my prior application.

The spokes made as described in my prior application are strong, and are effective for the purpose intended, but I find that the spoke can be improved in such a way as to practically eliminate entirely the possibility of the seam opening at any point. In carrying out this improvement, the seam is provided at a plurality of spaced points, three being here shown, with the indentations 17, which indentations depress the metal of the several layers composing the seam, and form a positive lock between the layers. These indentations are formed by a punch, or series of punches in the event that all the indentations or deformations are produced at one time, but in punching these deformations and thus displacing the metal in the four layers of the seam it is highly desirable that the outer layers be not sheared through at both ends of the deformations. Therefore these deformations, which as will be observed, extend lengthwise of the seam, and are narrow compared with their length, are tapered or wedge-shaped. They are preferably produced by a punch whose punching end is tapered, driving the metal deeper at one end of the deformation than at the other. In fact, the deformation is of maximum depth at one end thereof, and gradually tapers off to the normal surface of the seam. In this manner, while the outer layers are sheared at one end of the deformation, they are not sheared, but are left intact at the other end. With a deformation of this shape, the metal is depressed and displaced in all four layers, but in such a way that a most desirable locking effect is obtained.

I may vary the number of deformations or indentations such as described, providing more or less of them than here shown, as may be found desirable. Likewise, I may vary the distribution or location of these deformations as may be found desirable.

Having described my invention, I claim:

1. A tubular sheet metal spoke for vehicle wheels formed from a piece of sheet metal with one of its marginal portions overlapping the other, and the overlapping portions being indented to prevent spreading.

2. A tubular sheet metal spoke for vehicle wheels formed from a piece of sheet metal with its marginal portions overlapped and secured together, the overlapping portions having an elongated indentation to prevent spreading.

3. A tubular sheet metal spoke for vehicle wheels formed from a piece of sheet metal with its marginal portions connected together in the form of a seam, the seam being indented or deformed to lock the layers thereof and prevent spreading.

4. A tubular sheet metal spoke for vehicle wheels formed from a piece of sheet metal whose marginal portions are folded together in the form of a seam, said seam having the layers thereof indented or depressed to form locking indentations.

5. A tubular sheet metal spoke for vehicle wheels formed from a sheet of metal having its marginal portions locked together in the form of a seam, said seam at one or more points having the metal driven inwardly to form a tapered depression.

6. A tubular sheet metal spoke for vehicle wheels formed from a piece of metal having its marginal portions folded together in the form of a seam, said seam at one or more points having the layers thereof indented and the metal displaced with tapered indentations, with the metal of the outer layer or layers sheared at one end of the indentation, and intact at the other end thereof.

In testimony whereof, I hereunto affix my signature.

THOMAS N. AIKENS.